(12) United States Patent
Tan et al.

(10) Patent No.: US 10,096,121 B2
(45) Date of Patent: Oct. 9, 2018

(54) HUMAN-SHAPE IMAGE SEGMENTATION METHOD

(71) Applicant: Watrix Technology, Beijing (CN)

(72) Inventors: Tieniu Tan, Beijing (CN); Yongzhen Huang, Beijing (CN); Liang Wang, Beijing (CN); Zifeng Wu, Beijing (CN)

(73) Assignee: Watrix Technology, Beijing (CN)

( * ) Notice: Subject to any disclaimer, the term of this patent is extended or adjusted under 35 U.S.C. 154(b) by 22 days.

(21) Appl. No.: 15/312,829

(22) PCT Filed: May 23, 2014

(86) PCT No.: PCT/CN2014/078282
§ 371 (c)(1),
(2) Date: Nov. 21, 2016

(87) PCT Pub. No.: WO2015/176305
PCT Pub. Date: Nov. 26, 2015

(65) Prior Publication Data
US 2017/0200274 A1 Jul. 13, 2017

(51) Int. Cl.
*G06K 9/62* (2006.01)
*G06K 9/00* (2006.01)
(Continued)

(52) U.S. Cl.
CPC ............ *G06T 7/11* (2017.01); *G06K 9/00369* (2013.01); *G06K 9/46* (2013.01); *G06K 9/4642* (2013.01);
(Continued)

(58) Field of Classification Search
USPC .................................. 382/167, 157, 103, 173
See application file for complete search history.

(56) References Cited

U.S. PATENT DOCUMENTS 5,058,179 A * 10/1991 Denker ................ G06K 9/4628
382/158
9,892,344 B1 * 2/2018 Tran ........................ G06K 9/66
(Continued)

FOREIGN PATENT DOCUMENTS

| CN | 102682297 A | 9/2012 |
| CN | 102855490 A | 1/2013 |
| CN | 104067314 A | 9/2014 |

OTHER PUBLICATIONS

International Search Report for PCT/CN2014/078282, dated Feb. 2, 2015.

*Primary Examiner* — Kathleen Y Dulaney
(74) *Attorney, Agent, or Firm* — Howard IP Law, PLLC; Jeremy Howard

(57) ABSTRACT

A human-shape image segmentation method comprising: extracting multi-scale context information for all first pixel points for training a human-shape image; sending image blocks of all scales of all the first pixel points into a same convolution neural network to form a multi-channel convolutional neural network group, wherein each channel corresponds to image blocks of one scale; training the neural network group using a back propagation algorithm to obtain human-shape image segmentation training model data; extracting multi-scale context information for all second pixels points for testing the human-shape image; sending image blocks of different scales of each of the second pixel points into a neural network channel corresponding to the human-shape image segmentation training model, wherein if said first probability is larger than said second probability, the second pixel points belong to the human-shape region, otherwise, the second pixel points are outside of the human-shape region. The human-shape image segmentation method is fast in image segmentation speed and high in accuracy.

5 Claims, 2 Drawing Sheets

(51) Int. Cl.
  *G06K 9/34*    (2006.01)
  *G06T 7/11*    (2017.01)
  *G06K 9/46*    (2006.01)
  *G06K 9/66*    (2006.01)
  *G06N 3/08*    (2006.01)

(52) U.S. Cl.
  CPC ............ *G06K 9/6277* (2013.01); *G06K 9/66*
         (2013.01); *G06N 3/08* (2013.01); *G06T*
         *2207/20021* (2013.01); *G06T 2207/20081*
            (2013.01); *G06T 2207/30196* (2013.01)

(56)  References Cited

U.S. PATENT DOCUMENTS

| | | | |
|---|---|---|---|
| 2005/0104727 A1* | 5/2005 | Han | G06K 9/00335 |
| | | | 340/541 |
| 2009/0161912 A1 | 6/2009 | Yatom | |
| 2014/0177946 A1* | 6/2014 | Lim | G06K 9/4614 |
| | | | 382/156 |
| 2016/0148080 A1* | 5/2016 | Yoo | G06K 9/4628 |
| | | | 382/157 |
| 2017/0032285 A1* | 2/2017 | Sharma | G06N 3/08 |
| 2017/0169567 A1* | 6/2017 | Chefd'hotel | G06K 9/00127 |

\* cited by examiner

HUMAN-SHAPE IMAGE SEGMENTATION METHOD

TECHNICAL FIELD

The present invention relates to the field of pattern recognition, in particular to a human-shape image segmentation method based on multi-scale context deep learning.

BACKGROUND OF THE INVENTION

As far as image object segmentation methods are concerned, the existing segmentation method is to establish a relationship between each pixel point and its adjacent pixel points and to model said relationship using a graphic model. When there are only few adjacent pixel points (for example, several or a dozen adjacent pixel points are considered in a graphic model based method), it is impossible to form any semantically meaningful segmentation; but when a large number of adjacent pixel points are considered, the computation will be very complicated and it is highly possible that the model is difficult to converge.

SUMMARY OF THE INVENTION

The object of the present invention is to provide a human-shape image segmentation method to overcome the defects in the prior art, which uses multi-scale context information of pixel points within a human-shape region to represent a human-shape object, and describes context information of different scales in a human-shape local region through a multi-channel deep learning network.

To achieve the above-mentioned object, the present invention provides a human-shape image segmentation method, which comprises:

step S1: extracting multi-scale context information for all first pixel points for training a human-shape image;

step S2: sending image blocks of all scales of all the first pixel points into the same convolution neural network to form a multi-channel convolutional neural network group, wherein each channel corresponds to image blocks of one scale;

step S3: training the neural network group using a back propagation algorithm to obtain human-shape image segmentation training model data;

step S4: extracting multi-scale context information for all second pixels points for testing the human-shape image;

step S5: sending image blocks of different scales of each of the second pixel points into a neural network channel corresponding to the human-shape image segmentation training model, wherein all of said neural network channels are merged together in a full-connected layer, a first value representing a first probability of said second pixel points belonging to the human-shape region is output at a first node of the last layer of the full-connected layer, and a second value representing a second probability of said second pixel points being outside of the human-shape region is output at a second node of the last layer of the full-connected layer; if said first probability is larger than said second probability, the second pixel points belong to the human-shape region, otherwise, the second pixel points are outside of the human-shape region.

Further, said step S1 specifically includes: for all first pixel points inside and outside of the human-shape region for training the human-shape image, extracting image blocks of different scales by using the first pixel point as the center.

Further, in said step S2, the multi-channel convolutional neural network group are merged together in the full-connected layer; wherein the last layer of the full-connected layer is an output layer and comprises a first node and a second node, and output of all pixel points inside the human-shape region corresponds to said first node, and output of all pixel points outside the human-shape region corresponds to said second node.

Further, said step S4 specifically includes: for all second pixel points for testing the human-shape image, extracting image blocks of different scales by using said second pixel point as the center.

The human-shape image segmentation method of the present invention has fast image segmentation speed and high accuracy.

DETAILED DESCRIPTION OF THE PREFERRED EMBODIMENTS

The technical solution of the present invention will be described in further detail below through figures and embodiments.

The deep learning theory has achieved very good results in such fields as voice recognition, image object classification and detection, etc., and technologies based on said theory can be easily extended into different types of applications.

A human-shape image segmentation method based on multi-scale context deep learning describes the relationship between each pixel point and its surrounding wide range of pixel points (which may be over 10000 pixel points) by means of the deep learning technology, models said relationship with a convolutional neural network, and achieves excellent results of human-shape image segmentation.

Figure 1:
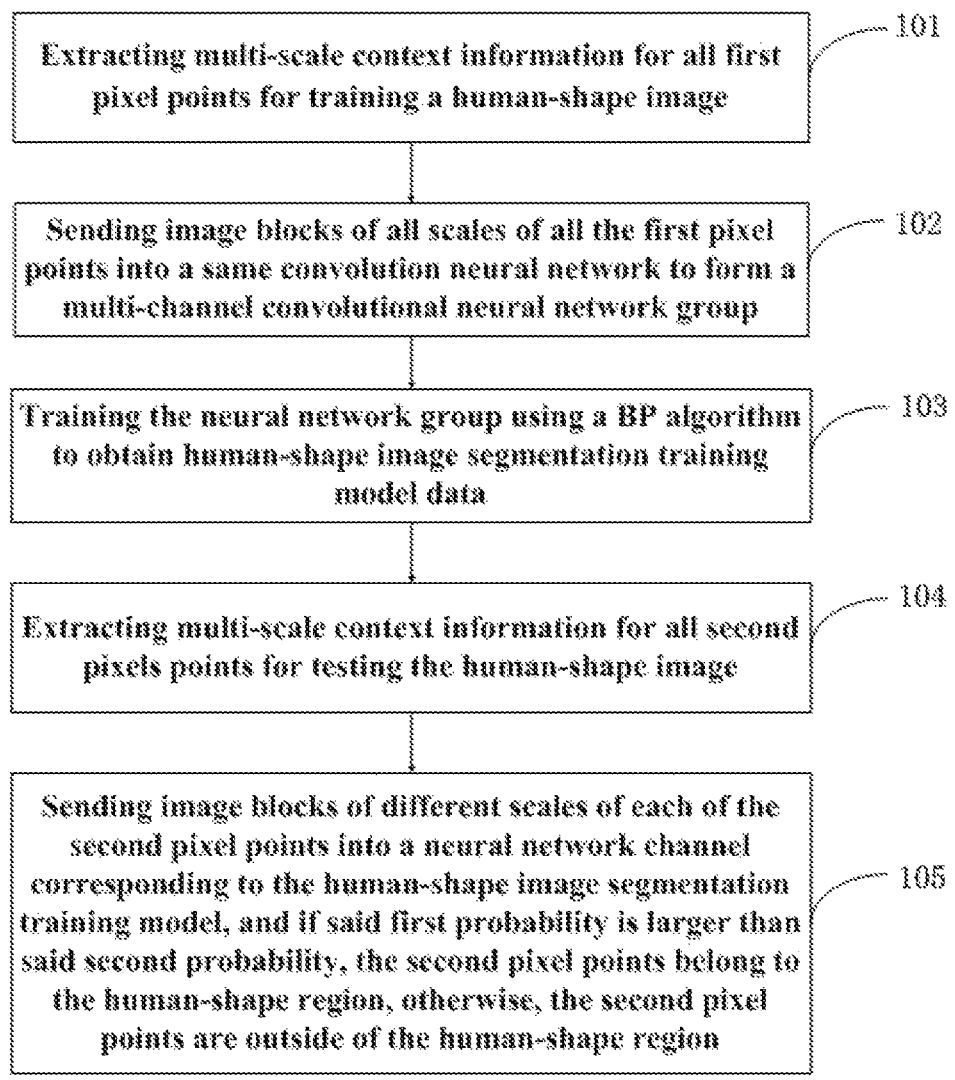
FIG. 1 is a flow chart of the human-shape image segmentation method according to the present invention.

FIG. 1 is a flow chart of the human-shape image segmentation method according to the present invention. As shown in the figure, the present invention specifically includes the following steps:

Step 101: extracting multi-scale context information for all first pixel points for training a human-shape image.

Specifically, for all first pixel points inside and outside of the human-shape region for training the human-shape image, image blocks of different scales are extracted by using the first pixel point as the center.

Step 102: sending image blocks of all scales of all the first pixel points into the same convolution neural network to form a multi-channel convolutional neural network group, wherein each channel corresponds to image blocks of one scale.

There may be multiple first pixel points, and the image blocks extracted for each of the first pixel points may have different scales. When sending the image blocks into the convolutional neural network, each channel corresponds to image blocks of one scale, so the scales of the image blocks corresponding to each channel are also different, while the scales of the image blocks entering into said channel are the same.

In step 102, the multi-channel convolutional neural network group are merged together in the full-connected layer; the last layer of said full-connected layer is an output layer and comprises a first node and a second node; output of all pixel points inside the human-shape region corresponds to said first node, and output of all pixel points outside the human-shape region corresponds to said second node.

For example, the deep neural network of each channel has the following parameter configuration: the first layer has 48 convolution operators of 5×5, whose step size is 1, and has 3×3 spatial aggregation layers whose step size is 2; the second layer has 128 convolution operators of 5×5, whose step size is 1, and has 3×3 spatial aggregation layers whose step size is 2; the third layer has 192 convolution operators, whose step size is 1; the fourth layer has 192 convolution operators, whose step size is 1; the fifth layer has 128 convolution operators, whose step size is 1, and has 3×3 spatial aggregation layers whose step size is 2. The parameter configuration of the full-connected layer is that the sixth layer has 1024 nodes, the seventh layer has 1024 nodes, and the eighth layer has two nodes, i.e. the first node and the second node, which correspond to the inside of the human-shape region and the outside of the human-shape region, respectively.

Step 103: training the neural network group using a back propagation (BP) algorithm to obtain human-shape image segmentation training model data.

Said BP algorithm is mainly used for training of multi-layer models, and the main body of said algorithm consists of repeated iteration of the two steps, i.e., excitation propagation and weight updating, until a convergence condition is reached. In the stage of excitation propagation, a training sample is sent to the network first to obtain excitation response, then a difference between the response and a target output corresponding to the training sample is calculated, thereby obtaining an error between an output layer and a monitoring layer. In the stage of weight updating, the known error is firstly multiplied by a derivative of a function between the present layer response and the previous layer response so as to obtain a gradient of a weight matrix between the two layers, then the weight matrix is adjusted at a certain proportion along a direction opposite to said gradient, next, said gradient is considered as the error of the previous layer so as to calculate a weight matrix of the previous layer. Update of the whole model is finished in this manner.

Figure 2:
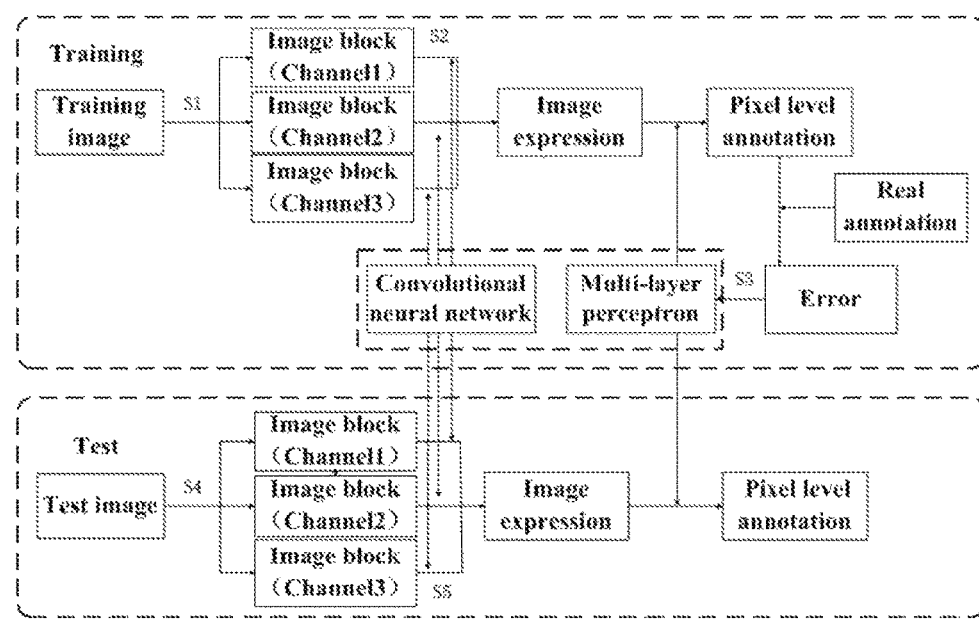
FIG. 2 is a schematic drawing of the human-shape image segmentation method according to the present invention.

FIG. 2 is a schematic drawing of the human-shape image segmentation method according to the present invention. Steps 101, 102 and 103 are training stages, in which annotation of a certain number of (e.g. 5000 images) samples is needed for training the model. In this embodiment, the sample means to annotate each pixel point in the pedestrian region as 1 and annotate other regions as 0.

Specifically, context information of three scales (e.g. 224*224, 112*112, 56*56) are extracted for each pixel point of the 5000 images, namely, image blocks of three scales are extracted using said pixel point as the center. Before being sent into the network, said image blocks are first scaled to a size of 56×56. Image blocks having the same scale of all pixel points are sent into the same convolutional neural network to form a three-channel convolutional neural network group. All channels are merged together in the full-connected layer. In the last layer (output layer) of the neural network group, the pixel points of the pedestrian region correspond to one node, i.e. the first node, and the pixel points of the pedestrian background region correspond to another node, i.e. the second node.

Step 104: extracting multi-scale context information for all second pixels points for testing the human-shape image.

Specifically, for all second pixels points for testing the human-shape image, image blocks of different scales are extracted using said second pixel point as the center.

Step 105: sending image blocks of different scales of each of the second pixel points into a neural network channel corresponding to the human-shape image segmentation training model, all of said neural network channels are merged together in a full-connected layer, a first value representing a first probability of said second pixel points belonging to the human-shape region is output at a first node of the last layer of the full-connected layer, and a second value representing a probability of said second pixel points being outside of the human-shape region is output at a second node of the last layer of the full-connected layer; if said first probability is larger than said second probability, the second pixel points belong to the human-shape region, otherwise, the second pixel points is outside of the human-shape region.

After judging all the second pixel points of the test image, the human-shape image segmentation is completed.

Steps 104 and 105 are testing stages, in which pedestrian region segmentation is performed on any image with a pedestrian. Specifically, a test image is input and context information of three scales (224*224, 112*112, 56*56) are extracted for each pixel point thereof, namely, image blocks of three scales are extracted using said pixel point as the center. Before being sent into the network, said image blocks are first scaled to a size of 56×56. Image blocks of different scales of each pixel point are sent into a neural network channel corresponding to the trained model, and all channels are merged together in the full-connected layer, and a value will be outputted at each of the two nodes of the last layer of the full-connected layer, indicating the probabilities of the pixel point belonging to a pedestrian and a background. If the probability of belonging to the pedestrian is greater than the probability of belonging to the background, then it can be determined that said pixel point belongs to the pedestrian, otherwise, it can be determined that said pixel point belongs to the background.

Professionals shall be able to further realize that the exemplary elements and algorithm steps described here in conjunction with the embodiments can be implemented by electronic hardware or computer software or a combination thereof, and in order to clearly illustrate the interchangeability between the hardware and software, the exemplary composition and steps have been generally described in terms of the functions in the above text. As for whether these functions are realized by hardware or software, it depends on the specific application of the technical solution as well as the restraints of the design. Professionals can use different methods to realize the described functions for each specific application, which shall not be deemed as beyond the scope of the present invention.

The steps of the method or algorithm described in conjunction with the embodiments herein can be implemented by hardware or software modules executed by a processor or a combination thereof. The software modules may be stored in a random access memory (RAM), a memory, a read only memory (ROM), an electrically programmable ROM, an electrically erasable and programmable ROM, a register, a hard disc, a movable disc, a CD-ROM, or any other form of storage medium known in the art.

The above described preferred embodiments describe in detail the object, technical solution and advantageous effects of the present invention. However, it shall be understood that the above described is merely preferred embodiments of the present invention, but does not limit the protection scope of the present invention. Any modification, equivalent substitution, improvements, etc. made according to the spirit and principle of the present invention shall fall into the protection scope of the present invention.

What is claimed is:

1. A human-shape image segmentation method, characterized by comprising:
   step S1: extracting multi-scale context information for all first pixel points for training a human-shape image;
   step S2: sending image blocks of all scales of all the first pixel points into a same convolution neural network to form a multi-channel convolutional neural network group, wherein each channel corresponds to image blocks of one scale;
   step S3: training the neural network group using a back propagation algorithm to obtain human-shape image segmentation training model data;
   step S4: extracting multi-scale context information for all second pixels points for testing the human-shape image;
   step S5: sending image blocks of different scales of each of the second pixel points into a neural network channel corresponding to the human-shape image segmentation training model, wherein all of said neural network channels are merged together in a full-connected layer, a first value representing a first probability of said second pixel points belonging to a human-shape region is output at a first node of the last layer of the full-connected layer, and a second value representing a second probability of said second pixel points being outside of the human-shape region is output at a second node of the last layer of the full-connected layer; if said first probability is larger than said second probability, the second pixel points belong to the human-shape region, otherwise, the second pixel points are outside of the human-shape region.

2. The method according to claim 1, characterized in that said step S1 specifically includes: for all first pixel points inside and outside of the human-shape region for training the human-shape image, extracting image blocks of different scales by using the first pixel point as a center.

3. The method according to claim 1, characterized in that in said step S2, the multi-channel convolutional neural network group are merged together in the full-connected layer; the last layer of the full-connected layer is an output layer and comprises said first node and said second node, and output of all pixel points inside the human-shape region corresponds to said first node, and output of all pixel points outside the human-shape region corresponds to said second node.

4. The method according to claim 1, characterized in that said step S4 specifically includes: for all second pixel points for testing the human-shape image, extracting image blocks of different scales by using said second pixel point as a center.

5. The method according to claim 1, wherein each channel comprises:
   a first layer including 48 convolution operators of 5×5, whose step size is 1, and has 3×3 spatial aggregation layers whose step size is 2;
   a second layer including 128 convolution operators of 5×5, whose step size is 1, and has 3×3 spatial aggregation layers whose step size is 2;
   a third layer including 192 convolution operators, whose step size is 1;
   a fourth layer including 192 convolution operators, whose step size is 1, and has 3×3 spatial aggregation layers whose step size is 2;
   a fifth layer including 128 convolution operators, whose step size is 1, and has 3×3 spatial aggregation layers whose step size is 2;
   a sixth layer which is a fully-connected layer including 1024 nodes;
   a seventh layer including 1024 nodes; and
   an eighth layer having 2 nodes which correspond to the first value and the second value.

* * * * *